United States Patent
Chang

(10) Patent No.: US 9,836,154 B2
(45) Date of Patent: Dec. 5, 2017

(54) SELECTIVE TOUCH SCAN AREA AND REPORTING TECHNIQUES

(71) Applicant: Nook Digital, LLC, New York, NY (US)

(72) Inventor: Songan Andy Chang, San Jose, CA (US)

(73) Assignee: NOOK DIGITAL, LLC, New York, NY (US)

( * ) Notice: Subject to any disclaimer, the term of this patent is extended or adjusted under 35 U.S.C. 154(b) by 454 days.

(21) Appl. No.: 13/749,410

(22) Filed: Jan. 24, 2013

(65) Prior Publication Data

US 2014/0204035 A1    Jul. 24, 2014

(51) Int. Cl.
G06F 3/041 (2006.01)

(52) U.S. Cl.
CPC .................. *G06F 3/0416* (2013.01)

(58) Field of Classification Search
CPC ...... G06F 3/0416; G06F 3/0418; G06F 3/043; G06F 3/0433; G06F 3/0436; G06F 2203/041; G06F 3/03547; G06F 3/041; G06F 3/0412; G06F 3/0414; G06F 3/046; G06F 3/047; H05K 9/0073; H05K 9/0079; H05K 9/0081
USPC .................... 345/156–178; 715/700
See application file for complete search history.

(56) References Cited

U.S. PATENT DOCUMENTS

| | | | |
|---|---|---|---|
| 4,686,332 A * | 8/1987 | Greanias et al. | 345/173 |
| 4,896,543 A | 1/1990 | Gullman | |
| 5,402,151 A * | 3/1995 | Duwaer | G06F 3/044 |
| | | | 178/18.05 |
| 5,633,471 A | 5/1997 | Fukushima | |
| 5,844,557 A | 12/1998 | Shively, II | |
| 5,862,256 A * | 1/1999 | Zetts | G06K 9/00416 |
| | | | 382/187 |
| 5,956,020 A * | 9/1999 | D'Amico | G06F 3/0418 |
| | | | 345/173 |

(Continued)

FOREIGN PATENT DOCUMENTS

| | | |
|---|---|---|
| EP | 0722150 A1 | 7/1996 |
| WO | 2011013400 A1 | 2/2011 |

OTHER PUBLICATIONS

"Adonit Jot Touch (for iPad)," Adonit Jot Touch (for iPad) Review & Rating—pcmag.com; http://www.pcnnag.com/article2/0,2817,2411192,00.asp; 6pages, printed from the Internet on Jun. 20, 2013.

(Continued)

*Primary Examiner* — Grant Sitta
(74) *Attorney, Agent, or Firm* — Finch & Maloney PLLC

(57) ABSTRACT

Techniques are disclosed for selective area scanning, touch scanning, and/or reporting of touch screen contacts in electronic touch sensitive devices. The selective area scanning can be used to only scan a specific section of a touch screen area, the selective touch scanning can be used to scan only for specific touches or input sources on a touch screen, and the selective reporting can be used to selectively report only desired contacts to a device processor and reject all other contacts. Multiple selective scan areas can be provisioned, with each discrete area customizable with respect to location, size, accepted touch types and/or reporting criteria. In some cases the user can configure some or all of these selective screen features.

16 Claims, 8 Drawing Sheets

(56) References Cited

U.S. PATENT DOCUMENTS

| | | | |
|---|---|---|---|
| 6,259,438 B1 | 7/2001 | Fleck et al. | |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,089,470 B1* | 1/2012 | Schediwy et al. | 345/173 |
| 8,239,413 B2 | 8/2012 | Hubert | |
| 8,274,536 B2 | 9/2012 | Chaudhri et al. | |
| 8,286,104 B1 | 10/2012 | Yonge-Mallo | |
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 8,669,955 B2 | 3/2014 | Nishio et al. | |
| 8,669,962 B2* | 3/2014 | Kuan | G06F 3/0418 345/173 |
| 8,797,287 B2* | 8/2014 | Sundara-Rajan et al. | 345/173 |
| 2001/0025289 A1 | 9/2001 | Jenkins et al. | |
| 2002/0116421 A1 | 8/2002 | Fox et al. | |
| 2003/0080946 A1* | 5/2003 | Chuang | 345/173 |
| 2004/0196267 A1* | 10/2004 | Kawai et al. | 345/173 |
| 2006/0012581 A1 | 1/2006 | Haim et al. | |
| 2006/0109252 A1* | 5/2006 | Kolmykov-Zotov | G06F 3/03545 345/173 |
| 2007/0047002 A1 | 3/2007 | Hull et al. | |
| 2008/0036747 A1 | 2/2008 | Hope | |
| 2009/0174679 A1* | 7/2009 | Westerman | G06F 3/03547 345/173 |
| 2010/0095205 A1* | 4/2010 | Kinoshita | 715/702 |
| 2010/0100854 A1 | 4/2010 | Russell et al. | |
| 2010/0103098 A1* | 4/2010 | Gear | G06F 1/1626 345/158 |
| 2010/0192086 A1 | 7/2010 | Kocienda et al. | |
| 2010/0229130 A1 | 9/2010 | Edge et al. | |
| 2010/0259482 A1 | 10/2010 | Ball | |
| 2010/0262659 A1 | 10/2010 | Christiansen et al. | |
| 2010/0306718 A1* | 12/2010 | Shim | G06F 3/04883 715/863 |
| 2010/0318895 A1 | 12/2010 | Steinberger et al. | |
| 2011/0157068 A1* | 6/2011 | Parker et al. | 345/174 |
| 2011/0258542 A1 | 10/2011 | Kenney et al. | |
| 2011/0265179 A1* | 10/2011 | Newman | G06F 21/604 726/22 |
| 2011/0294467 A1* | 12/2011 | Kim | G06F 1/1643 455/411 |
| 2012/0056821 A1 | 3/2012 | Goh | |
| 2012/0127109 A1 | 5/2012 | Nishio et al. | |
| 2012/0127110 A1 | 5/2012 | Amm et al. | |
| 2012/0139879 A1 | 6/2012 | Kim et al. | |
| 2012/0154294 A1* | 6/2012 | Hinckley | G06F 1/1649 345/173 |
| 2012/0158629 A1* | 6/2012 | Hinckley et al. | 706/15 |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0256880 A1* | 10/2012 | Han et al. | 345/175 |
| 2012/0262407 A1* | 10/2012 | Hinckley et al. | 345/173 |
| 2012/0262411 A1* | 10/2012 | Ahn et al. | 345/174 |
| 2012/0274583 A1* | 11/2012 | Haggerty | 345/173 |
| 2012/0280947 A1 | 11/2012 | Weaver et al. | |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0027323 A1* | 1/2013 | Chang | 345/173 |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0082945 A1* | 4/2013 | Jo | H04M 1/67 345/173 |
| 2013/0106716 A1* | 5/2013 | Sundara-Rajan | G06F 3/0416 345/173 |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0174100 A1* | 7/2013 | Seymour | G06F 3/0487 715/863 |
| 2013/0185680 A1 | 7/2013 | Chaudhri et al. | |
| 2013/0194308 A1 | 8/2013 | Privault et al. | |
| 2013/0265243 A1* | 10/2013 | Law | G06F 1/3262 345/173 |
| 2014/0298672 A1* | 10/2014 | Straker | H04W 12/06 34/175 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Explaining how the sPen tech works (and is very diff than other styluses)," http://forum.xda-developers.com/showthread.php?t=, 1 page, printed from the Internet on Jan. 15, 2013.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

(56) References Cited

OTHER PUBLICATIONS

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," Brando—mobile.brando.com, http://mobile.brando.com/Padblue-2__p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen the future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.cominew-touchscreen-technology, 4 pages, printed from the Internet on Aug. 2, 2013.

Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset," Brando—mobile.brando.com, http://mobile.brando.com/prod_detail.php?prod_id=03291, 4 pages, printed from the Internet on May 10, 2013.

"The JukeStyle is a great budget stylus for your iOS devices," stylus Archives—iPad News, http://www.ipadnews.nl/tag/stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.

Bragdon, et al., "Experimental Analysis of Touch-Screen Gesture Designs in Mobile Environments", Proceedings of the SIGCHI Conference on Human Factors in Computing Systems, pp. 403-412 (2011).

"Gesture Search for Google Mobile", Google Mobile, www.google.com/mobile/gesture-search, 1 page, printed from the Internet on Dec. 26, 2012.

"Comics by comiXology," Comic Book Reader Guide, http://www.comicbookreaderguide.com/comics-by-comixology/, 24 pages, printed from the Internet on May 6, 2013.

"NFC Forum: Frequently Asked Questions," http://www.nfc-forum.org/resources/faqs#acknowledge, 11 pages, printed from the Internet on Feb. 18, 2013.

"How to Remote Wipe an iPhone or iPad," OSXDaily, http://osxdaily.com/2012/06/05/remote-wipe-iphone-or-ipad/, 4 pages, printed from the Internet on Feb. 2, 2013.

"Screen hotspot," Wikipedia, the free encyclopedia, http://en.wikipedia.org/wiki/Screen_hotspot, 1 page, printed from the Internet on May 15, 2013.

"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.

Kanai, et al., "Intra-Rendition Navigation," Copyright 2012-2013 International Digital Publishing Forum (IDPF), 13 pages.

"Simultaneous Pen & Touch: The Natural Way to Work" Perceptive Pixel Active Stylus, downloaded on Dec. 14, 2012 from URL: www.perceptivepixel.com/_literature_136086/Active_Stylus, 2012, 2 pages.

\* cited by examiner

SELECTIVE TOUCH SCAN AREA AND REPORTING TECHNIQUES

FIELD OF THE DISCLOSURE

This disclosure relates to electronic display devices, and more particularly, to user input scanning techniques for touch sensitive devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an e-book, an online article or blog, images, documents, an inking or drawing application, a movie or video, just to name a few types. Such display devices are also useful for displaying a user interface that allows a user to interact with files other content on the device. The user interface may include, for example, one or more touch screen controls and/or one or more displayed labels that correspond to nearby hardware buttons. The user may interact with the touch sensitive device using fingers, a stylus, or other implement. The touch screen display may be backlit or not, and may be implemented for instance with an LCD screen or an electrophoretic display. Such devices may also include other touch sensitive surfaces, such as a track pad (e.g., capacitive or resistive touch sensor) or touch sensitive housing (e.g., acoustic sensor).

DETAILED DESCRIPTION

Figures 1A, 1B:
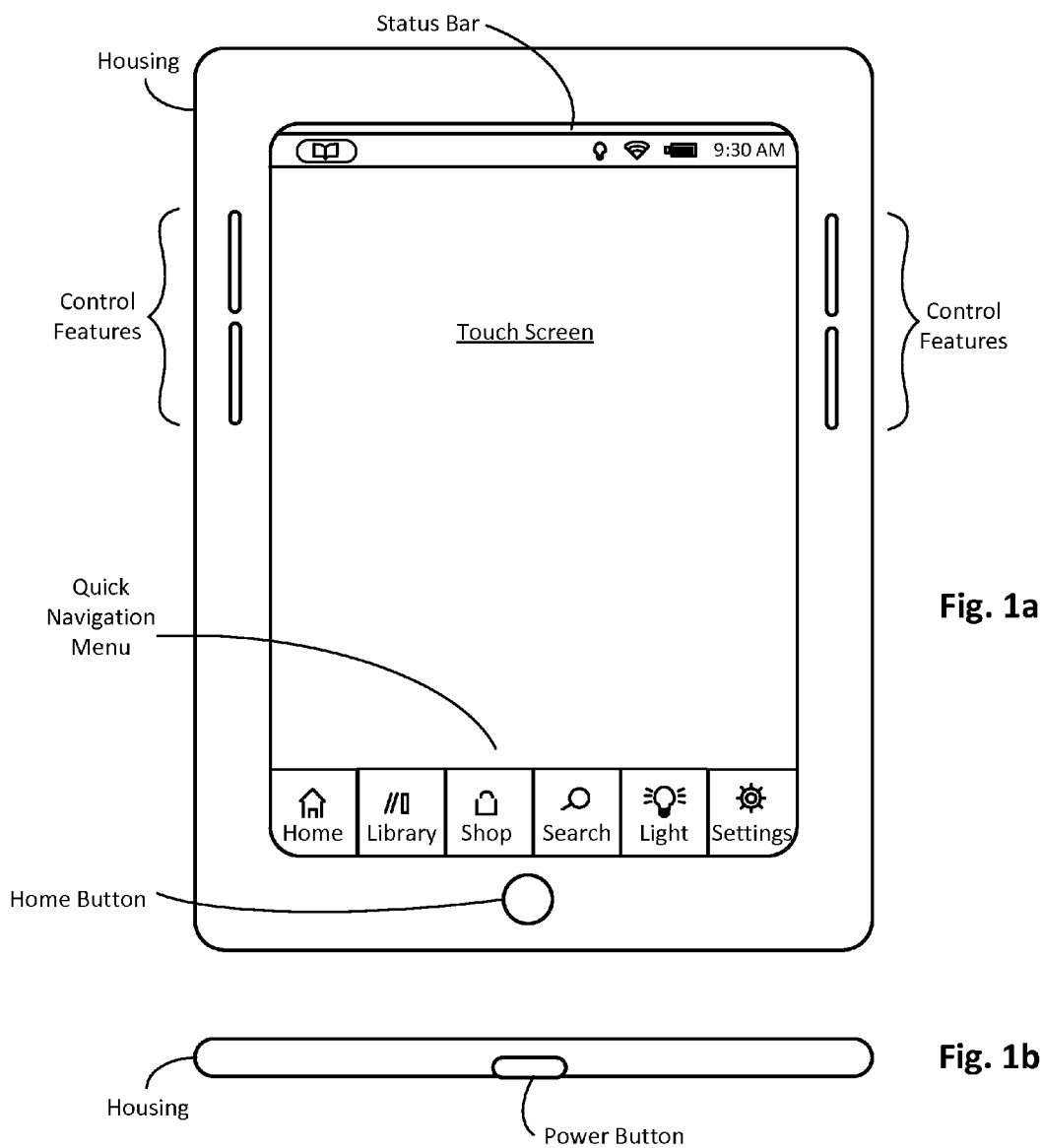
FIGS. 1a-b illustrate an example electronic touch sensitive device configured with a selective touch screen function, in accordance with an embodiment of the present invention.

Techniques are disclosed for selective area scanning, touch scanning, and/or reporting of touch screen contacts in electronic touch sensitive devices. The selective area scanning can be used to only scan a specific section of a touch screen area, effectively creating dead zones on the touch screen where no user contacts can be detected. The selective touch scanning can also be used to scan only for specific touches or input sources on a touch screen, such as an active stylus input or a finger contact, while rejecting all other types of screen contact. The selective reporting of touch screen contacts can be used to selectively report only desired contacts to a device processor and reject all other contacts. Rejecting unwanted user contacts at the touch screen controller level, before the controller reports to the processor, reduces the burden on the device processor. A selective scan area may also be combined with customized input scanning and reporting features, such that certain areas only scan for or report certain user inputs. Such features can be used to reduce power consumption and may increase device performance by reducing the burden on the device processor. In some cases the user can configure some or all of these selective screen features, while in other cases the selective screen features are bud-coded or set by default.

General Overview

As previously explained, electronic display devices such as tablets, eReaders, and smart phones are commonly used for displaying user interfaces and consumable content. In some instances the user might desire to interact with the device in only using a stylus, or only a finger. In other instances the user might wish for the touch sensitive surface to only register screen taps and not sweeping gestures, or vice versa. In still other instances, the user might wish for a touch screen to only register contacts in a certain area of the screen, only register sweeping gestures in certain areas of the screen, or not register or scan for any inputs in a certain area of the screen. While some electronic devices provide hand-rejection techniques, or reject certain stray contacts on a touch sensitive surface, such techniques involve scanning the entire touch sensitive surface, registering the undesired input, analyzing the input at the processor to determine that it is an undesired input, and rejecting the input. Such techniques create undesired burden on the processor and waste valuable resources in scanning for, analyzing, and rejecting undesired inputs. There does not appear to be an effective and power-saving selective touch scanning and reporting function for electronic touch sensitive devices.

Thus, and in accordance with an embodiment of the present invention, techniques are provided for selectively scanning and reporting inputs in an electronic touch sensitive device. The techniques disclosed may be used to customize the touch screen of a device to only scan specific areas, to selectively scan certain areas, or to selectively report user contacts to the processor. In some embodiments, the user may identify a dead zone, or a no-scan zone, where the touch screen controller does not scan for any user inputs. If no inputs are desired in that area, device performance may increase by not unnecessarily scanning such an area. In other embodiments, the user may identify a selective scan area where only certain inputs are scanned for, such as inputs from an active stylus. In such a case, the user does not care about other inputs and device performance may increase by only scanning for a desired input source. In still other embodiments, the user may wish to scan for ail or some input sources but may only be interested in specific gestures, such as a sweeping gesture. In such a case, the touch screen controller may report sweeping gestures to the processor and reject all other gestures (such as a tap gesture) before reporting to the device processor. In still other embodiments, unwanted input sources may also be identified and discarded at the controller level if the screen is scanned for all input sources. In such an example embodiment, the screen may scan for all input sources but report only finger contacts while discarding active stylus inputs. Many other configurations and variations of these selective scan and/or reporting features will be apparent in light of this disclosure.

Note that any touch sensitive device (e.g., track pad, touch screen, or other touch sensitive surface, whether capacitive, resistive, acoustic or other input detecting technology) may be used to selectively detect the user input and the claimed invention is not intended to be limited to any particular type of touch sensitive technology, unless expressly stated.

Architecture

FIGS. 1a-b illustrate an example electronic touch sensitive device with a selective touch scanning and reporting function, configured in accordance with an embodiment of the present invention. The device could be, for example, a tablet such as the NOOK® tablet by Barnes & Noble. In a more general sense, the device may be any electronic device having a touch sensitive user interface and capability for displaying content to a user, such as a mobile phone or mobile computing device such as an eReader or laptop, a desktop computing system, a television, a smart display screen, or any other device having a touch screen display or a non-touch display screen that can be used in conjunction with a touch sensitive surface. As will be appreciated, the claimed invention is not intended to be limited to any particular kind or type of electronic device.

The touch screen display (or touch sensitive screen) can be any display that is configured with user input detecting technologies, whether capacitive, resistive, acoustic, active-stylus, and/or other input detecting technology. The screen display can be layered above input sensors, such as a capacitive sensor grid (e.g., for passive touch-based input, such as with a finger or passive stylus in the case of a so-called in-plane switching (IPS) panel), or an electromagnetic resonance (EMR) sensor grid (e.g., for active stylus-based input). In some embodiments, the touch screen display can be configured with a purely capacitive sensor, while in other embodiments the touch screen display may be configured to provide a hybrid mode that allows for both capacitive input and active stylus input. In still other embodiments, the touch screen display is configured with only an active stylus sensor. Numerous touch screen display configurations can be implemented using any number of known or proprietary screen based input detecting technology. In any such embodiments, a touch screen controller may be configured to selectively scan the touch screen display and/or selectively report contacts detected directly on or otherwise sufficiently proximate to (e.g., within a few centimeters) the touch screen display. Thus, in some such embodiments, the touch screen controller can be configured to interpret inputs from only a capacitive input, only an active stylus input, or both.

As previously explained, the user input may be provided, for example, by a passive implement (e.g., finger or capacitive stylus) or an active stylus, depending on the configuration of the touch screen display. In one example embodiment, an active stylus input can be provided by an actual physical contact on a touch sensitive surface. However, in other embodiments, the active stylus input may involve the stylus hovering some distance above the touch screen display surface (e.g., one to a few centimeters above the surface, or even farther, depending on the sensing technology deployed in the touch screen display), but nonetheless triggering a response at the device just as if direct contact were provided. As will be appreciated in light of this disclosure, an active stylus as used herein may be implemented with any number of active stylus technologies, such as DuoSense® pen by N-trig® (e.g., wherein the active stylus utilizes a touch sensor grid of a touch screen display) or EMR-based pens by Wacom technology, or any other commercially available or proprietary active stylus technology. Further recall that the active stylus sensor in the computing device may be distinct from an also provisioned touch sensor grid in the computing device. Having the touch sensor grid separate from the active stylus sensor grid allows the device to, for example, only scan for an active stylus input, a touch contact, or to scan specific areas for specific input sources, in accordance with some embodiments. In one such embodiment, the active stylus sensor grid includes a network of antenna coils that create a magnetic field which powers a resonant circuit within the active stylus. In such an example, the active stylus may be powered by energy from the antenna coils in the device and the stylus may return the magnetic signal back to the device, thus communicating the stylus' location, angle of inclination, speed of movement, etc. Such an embodiment also eliminates the need for a battery on the stylus.

As can be seen with this example configuration, the device comprises a housing that includes a number of hardware features such as a power button, control features, and a press-button (sometimes called a home button herein). A touch screen based user interface is also provided, which in this example embodiment includes a quick navigation menu having six main categories to choose from (Home Library, Shop, Search, Light, and Settings) and a status bar that includes a number of icons (a night-light icon, a wireless network icon, and a book icon), a battery indicator, and a clock. Other embodiments may have fewer or additional such user interface (UI) touch screen features, or different UI touch screen features altogether, depending on the target application of the device. Any such general controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or features, or device form factor.

In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device was stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, tapping the book icon may provide bibliographic information on the content or provide the main menu or table of contents for the book, movie, playlist, or other content.

Figure 1C:
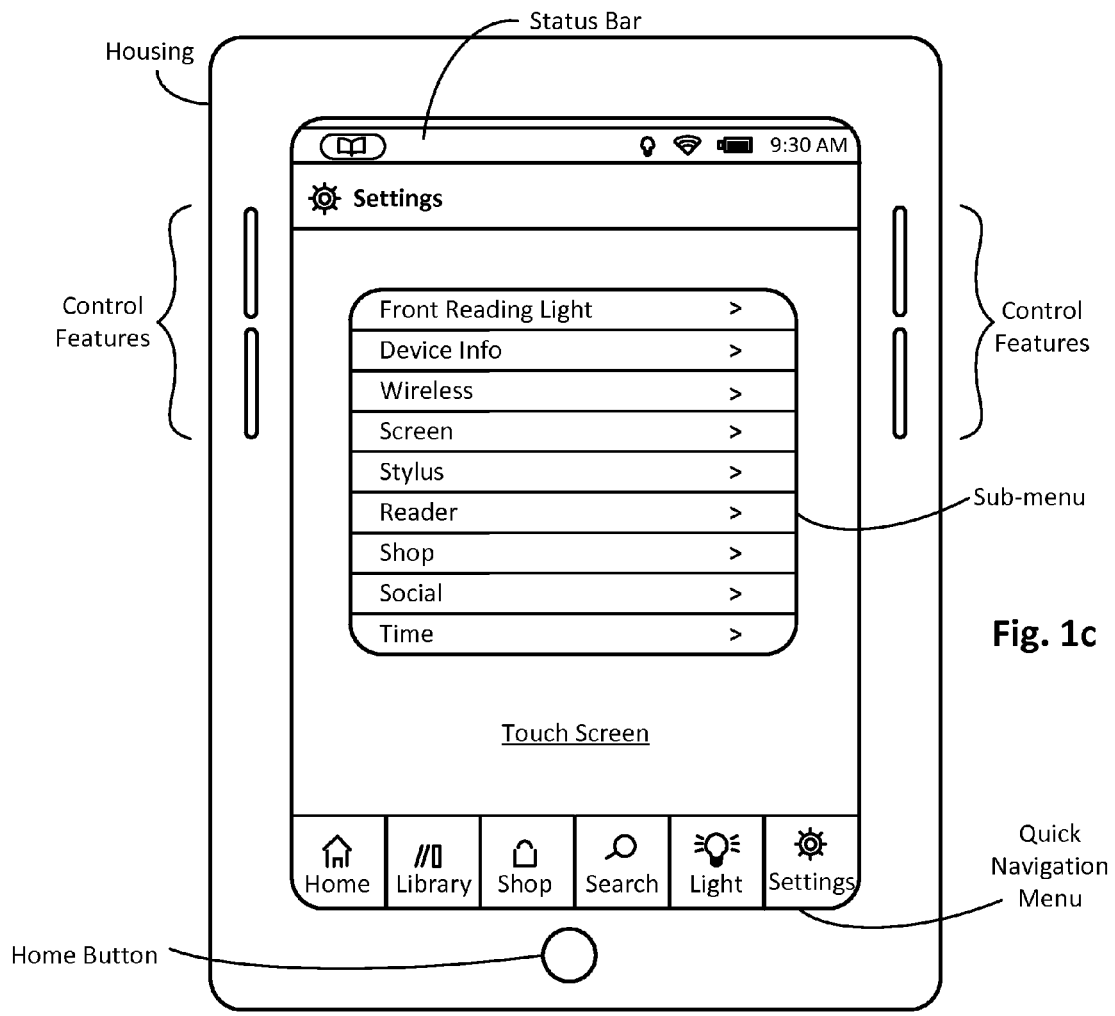
FIGS. 1c-d illustrate example configuration screen shots of the user interface of the electronic touch sensitive device shown in FIGS. 1a-b, configured in accordance with an embodiment of the present invention.
Figure 1D:
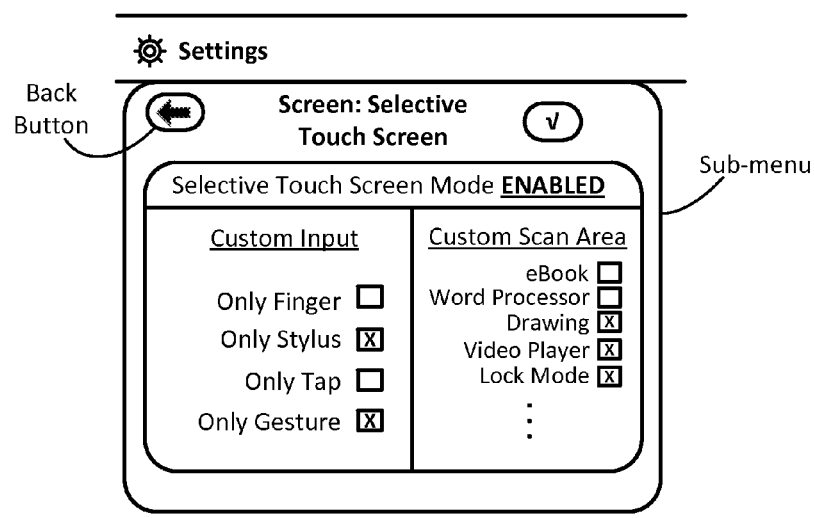

In one example embodiment, a selective touch screen configuration sub-menu, such as the one shown in FIG. 1*d*, may be accessed by tapping or otherwise selecting the Settings option in the quick navigation menu, which causes the device to display the general sub-menu shown in FIG. 1*c*. From this general sub-menu, the user can select any one of a number of options, including one designated Screen in this specific example case. Selecting this sub-menu item (with an appropriately placed screen tap) may cause the configuration sub-menu of FIG. 1*d* to be displayed, in accordance with an embodiment. In other example embodiments, selecting the Screen option may present the user with a number of additional sub-options, one of which may include a so-called selective touch screen function option, which may then be selected by the user so as to cause the selective touch screen configuration sub-menu of FIG. 1*d* to be displayed. Any number of such menu schemes and nested hierarchies can be used, as will be appreciated in light of this disclosure. In other embodiments, the selective touch screen function is hard-coded such that no configuration sub-menus are needed or otherwise provided (e.g., an application specific selective touch screen as described herein, with no user configuration).

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc). The user touch may be performed with a finger, a stylus, or any other suitable implement, unless otherwise specified. Additional example details of the underlying OS and circuitry in accordance with some embodiments will be discussed in turn with reference to FIG. 2.

As previously explained, and with further reference to FIGS. 1*c* and 1*d*, once the Settings sub-menu is displayed (FIG. 1*c*), the user can then select the Screen option. In response to such a selection, the selective scan/reporting configuration sub-menu shown in FIG. 1*d* can be provided to the user. The user can configure a number of features with respect to the selective area scanning and reporting feature, in this particular example. In this example case, the configuration sub-menu includes a UI check box that when checked, or otherwise selected by the user, effectively enables the selective touch screen mode (shown in the enabled state); unchecking the box disables the mode. Other embodiments may have the selective touch screen mode always enabled, while in other embodiments the mode may be enabled or disengaged by a physical switch or button, or by a uniquely identifiable gesture or screen contact, for example.

In this example embodiment the user can select, with a UI check box, a 'Custom Input' that is to be scanned for or reported by the touch sensitive surface. As can be further seen with reference to FIG. 1*d*, examples of possible custom inputs that may be scanned for and reported include 'Only Finger' inputs, 'Only Stylus' inputs, 'Only Tap' inputs, or 'Only Gesture' inputs. In some embodiments, the touch screen controller can scan only a determined section of the touch screen, thus creating a dead zone in non-scanned sections where no user input is scanned for. In other embodiments, the controller may selectively scan for specific inputs, such as a finger contact or an active stylus contact. In still other embodiments, the touch screen controller may analyze user contact and only report certain inputs to the processor, thus rejecting unwanted user input without using additional processor resources. In such an example, the user may only be interested in sweeping gestures in a certain area, and the controller may be programmed to only report sweeping gestures to the processor while rejecting tap gestures. This provides much more efficiency compared to analyzing and rejecting unwanted user inputs at the processor or application level. Multiple combinations and variation of these embodiments will be apparent in light of this disclosure.

In some embodiments, the user may specify a number of applications or scenarios in which the selective touch screen mode can be enabled. Such a configuration feature may be helpful, for instance, in a tablet or laptop or other multifunction computing device that can execute different applications (as opposed to a device that is more or less dedicated to a particular application). In this example case, the available applications are provided along with a corresponding check box as shown in FIG. 1*d*. Note the diverse nature of the examples, including an 'eBook' application, a 'Word Processor' application, a Drawing' application, a 'Video Player' application, and the 'Lock Mode' which are just a few examples. Any number of applications or device functions may benefit from a selective touch screen mode as provided herein, whether user-configurable or not, and the claimed invention is not intended to be limited to any particular application or set of applications. In this particular example shown in FIG. 1*d*, the selective touch screen mode is enabled for drawing and video player applications, as well as the lock mode.

As previously explained, the user may specify a number of custom inputs that are to be scanned for or selectively reported to the processor. Such a configuration feature may be helpful, for example, if the user is only interested in inputs from an active stylus, or a specific stylus. In such an example, the touch screen controller can selectively scan only for inputs from the active stylus and ignore any other contacts made on the touch screen. Such a configuration feature may also be helpful if the user wishes to scan an area for stylus inputs, for example, but is only interested in sweeping gestures. In such an example, the touch screen controller can scan for stylus inputs but only report sweeping gestures to the processor, rejecting all other stylus contacts at the controller level without consuming any processor resources. In this particular example case, the custom inputs of 'Only Stylus' and 'Only Gesture' inputs have been selected. In such an example, the screen controller may only scan for active stylus inputs, and the controller will only report stylus gestures to the processor while rejecting stylus taps before reporting to the processor. In another such example, the controller may scan the selective touch screen area for all inputs but reject non-stylus inputs at the controller level rather than perform a selective scan.

In addition, a back button arrow UI control feature may be provisioned on the touch screen, so that the user can go back to the Settings menu after the selective touch screen function has been configured, if so desired. While a number of user-configurable features are provided in some embodiments, other embodiments may have any combination of similar features wherein the features are set as a given default or are otherwise hard-coded, such that no user configuration is necessary.

Figure 2:
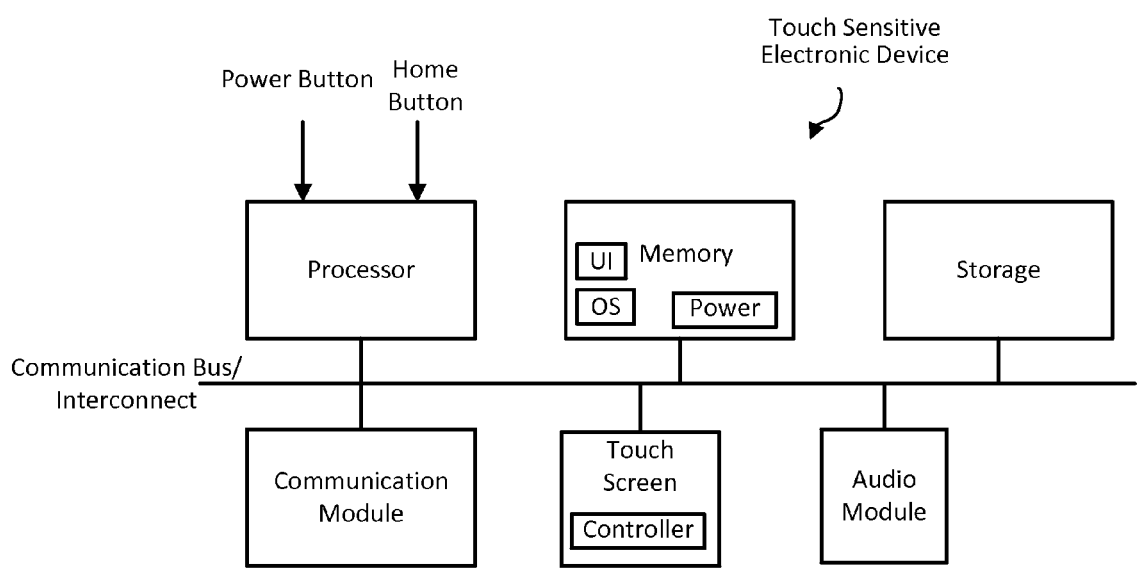
FIG. 2 illustrates a block diagram of an electronic touch sensitive device, configured in accordance with an embodiment of the present invention.

FIG. 2 illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen with a touch screen controller, and an audio module. A communications bus and interconnect is also provided to allow inter-device communication. Other typical componentry and functionality not reflected in the block diagram will be apparent (e.g., battery, co-processor, etc), in any such cases, the touch screen surface is generally capable of translating a user's physical contact with the surface into an electronic signal that can be manipulated or otherwise used to trigger a specific user interface action, such as those provided herein. As stated previously, the principles provided herein equally apply to any touch screen device.

In this example embodiment, the memory includes a number of modules stored therein that can be accessed and executed by the processor (and/or a co-processor). The modules include an operating system (OS), a user interface (LTD, and a power conservation routine (Power). The various modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 6-inch E-ink Pearl 800×600 pixel screen with Neonode® zForce® touch screen, or any other suitable display and touch screen interface technology. The communications module can be, for instance, any suitable 802.11 b/g/n WLAN chip or chip set which allows for connection to a local network so that content can be downloaded to the device from a remote location (e.g., content provider, etc., depending on the application of the display device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (M) module can be, for example, based on touch screen technology and the various example screen shots shown in FIGS. 1a-d, 3a-c, and 4, in conjunction with the selective touch screen methodologies demonstrated in FIGS. 5a-b, which will be discussed in turn. The audio module can be configured, for example, to speak or otherwise aurally present a selected eBook table of contents or other textual content, if preferred by the user. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher).

The touch screen controller can be any suitable controller (e.g. the CYP658756 chip by Cypress), with sufficient hardware control to implement the selective scan area features disclosed herein, and sufficient software to implement the selective scanning and reporting features. The touch screen controller may be local to the touch screen in some embodiments and may selectively scan, analyze, and/or selectively report touch screen inputs to the processor via the communications bus. The touch screen controller works with and reports to the processor, and although some inputs may be analyzed and rejected at the controller level, other functions may be performed at the processor if needed or otherwise desired. In other embodiments, the touch screen controller may also be in communication with an application currently running on a device, such that the controller may scan a custom area, or selectively report custom inputs based on which application the user is running at that moment. As will be appreciated in light of this disclosure, analyzing and selectively discarding and reporting inputs at the controller level can save power and processor resources, thus providing a more efficient touch sensitive computing system.

Selective Touch Screen Examples

Figure 3A:
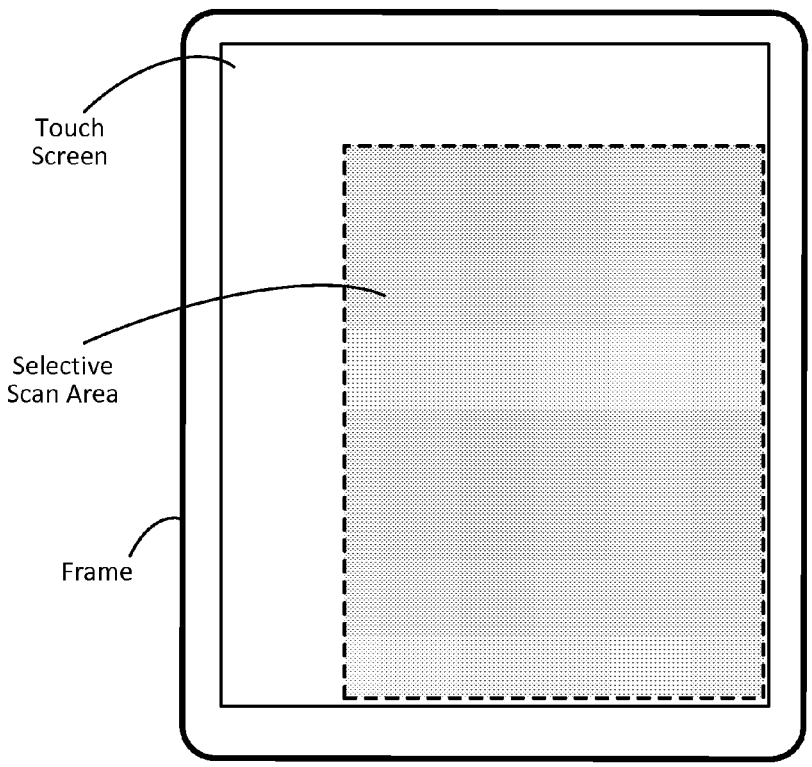
FIGS. 3a-c illustrate example selective touch screen scan regions in an electronic touch sensitive device, in accordance with various embodiments of the present invention.

FIG. 3a illustrates an example selective touch screen mode of an electronic touch sensitive device, in accordance with an embodiment of the present invention. As can be seen, a physical frame or support structure is provided about the screen of the device. As can be further seen in this example, the screen area contains a selective touch screen (or inking area, shown as the shaded area of the touch screen, and a secondary touch screen area on the upper and left borders of the touch screen. In one particular application of the present invention, the user has opened an inking application and only wishes to register stylus inputs/gestures in the inking area of the screen. In one such example configuration, the inking area can be a stylus-selective touch screen area (shown as the shaded section of the touch screen), while the secondary touch screen area (shown as the non-shaded section of the touch screen) can be scanned normally and all user inputs are registered and analyzed. This may be useful if the user wishes to only mark with a stylus within the drawing page of an inking application. In such an example, any stray hand contacts or tap inputs will not be registered/reported or otherwise affect the inking area of the screen.

In other embodiments, the secondary touch screen area of the screen may also selectively scan or report user inputs. In such an example, the upper and left borders of the touch screen may only scan or only report finger taps, while the inking area only scans or reports stylus gestures. In one embodiment, the selective touch screen area is be implemented by only scanning for stylus inputs within the selective touch screen area. In another embodiment, the selective screen area is implemented by having the touch screen controller discard all unwanted user inputs and only reporting certain inputs to the processor. Such embodiments conserve power and processor resources by selective scanning, or by discarding unwanted contacts at the touch screen controller level.

In some embodiments, either the selective touch screen area or the secondary touch screen area may be configured to scan for or report any number of user inputs. For example, the areas may be configured to only scan for finger inputs or stylus inputs, or they may be configured to only report taps, swipes, stylus inputs, multi-point contacts, etc. to the processor. In still other embodiments, either of the selective touch screen area or the secondary touch screen area may be configured as a dead zone that accepts no user input. Any number of combinations of scanning and reporting features may be implemented and will be apparent in light of this disclosure.

Figure 3B:
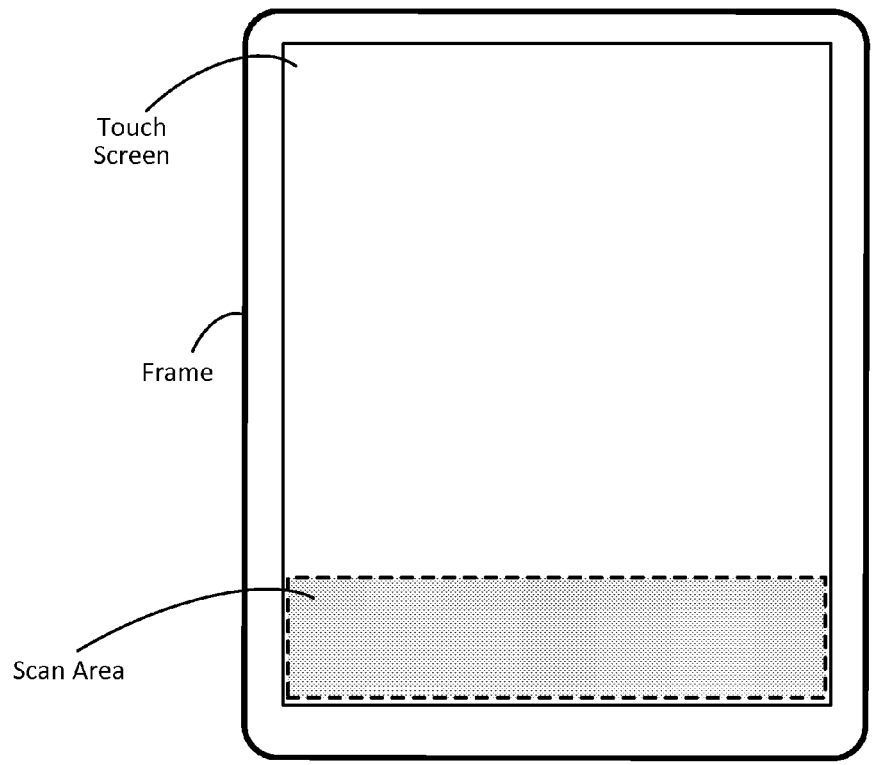

FIG. 3b illustrates another example selective touch screen mode of an electronic touch sensitive device, in accordance with an embodiment of the present invention. This particular example may be suitable for a lock mode selective scanning technique, wherein only a portion of the screen is scanned for user input while the rest of the screen is a dead zone. Such an embodiment may conserve power and processor resources by only scanning the area designed to detect an unlock UI gesture. As seen in this example, the touch screen area includes a scan area on the bottom of the screen, shown as the shaded area of the touch screen. The remainder of the touch screen area is a no-scan area. The scan and no-scan areas may be configured by the user to custom sizes and inputs, as discussed earlier, or they may be hard coded and not configurable. The context of this example case is for a lock mode feature at the bottom of a touch screen area (such as a slide bar touch screen UI feature), but numerous other context-specific embodiments will be appreciated in light of this disclosure. For instance, in another example embodiment, the scan and no-scan areas are configured for use with a text messaging application, wherein only the keyboard and text entry areas are scanned and all other areas are no-scan areas.

Figure 3C:
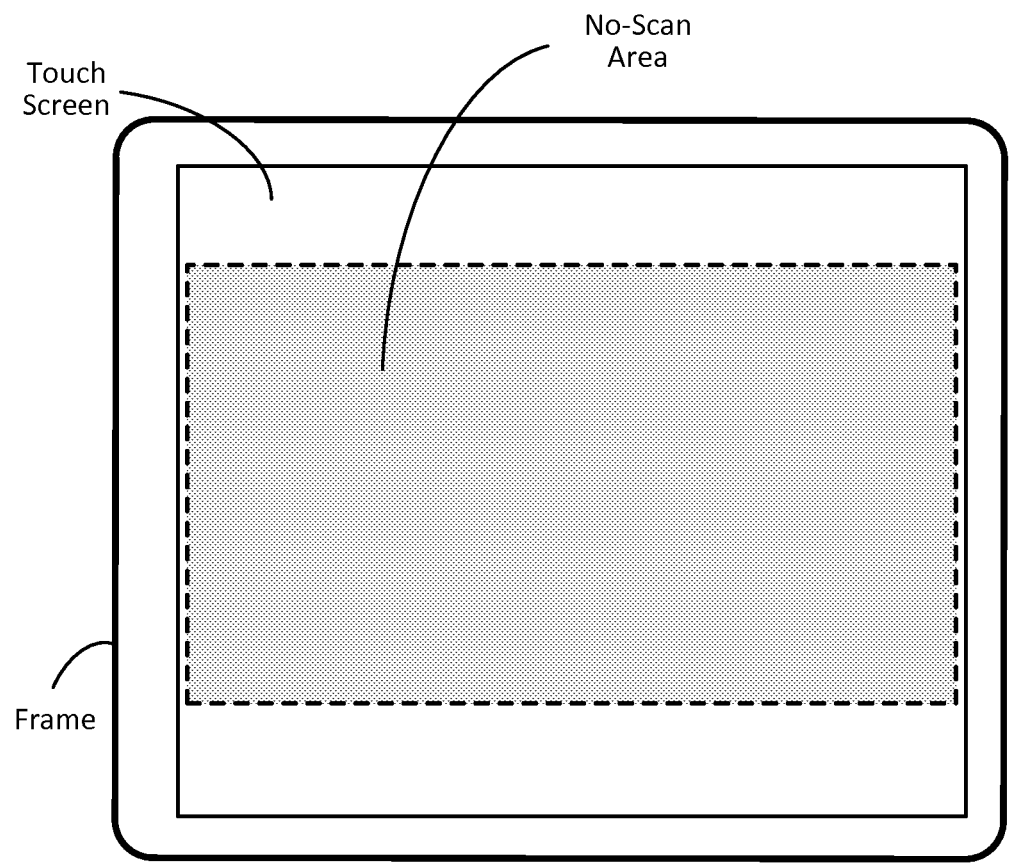

FIG. 3c illustrates another example selective touch screen mode of an electronic touch sensitive device, in accordance with an embodiment of the present invention. As can be seen, this particular example shows a large no-scan area in the center of the touch screen, shown as the shaded area of the touch screen. This large no-scan area is bordered on the top and the bottom by areas of the touch screen that are scanned normally for user inputs, in this example embodiment. Stray taps on a video screen may cause an unwanted pause or rewind in a movie, and this particular selective touch screen configuration may be useful, for example, for a video player application, where inputs are only expected at the control bar pause, play, stop, rewind, etc) and/or volume control area of the video player. In addition to creating a more convenient viewing experience, the selective scanning can increase device performance and battery life.

Figure 4:
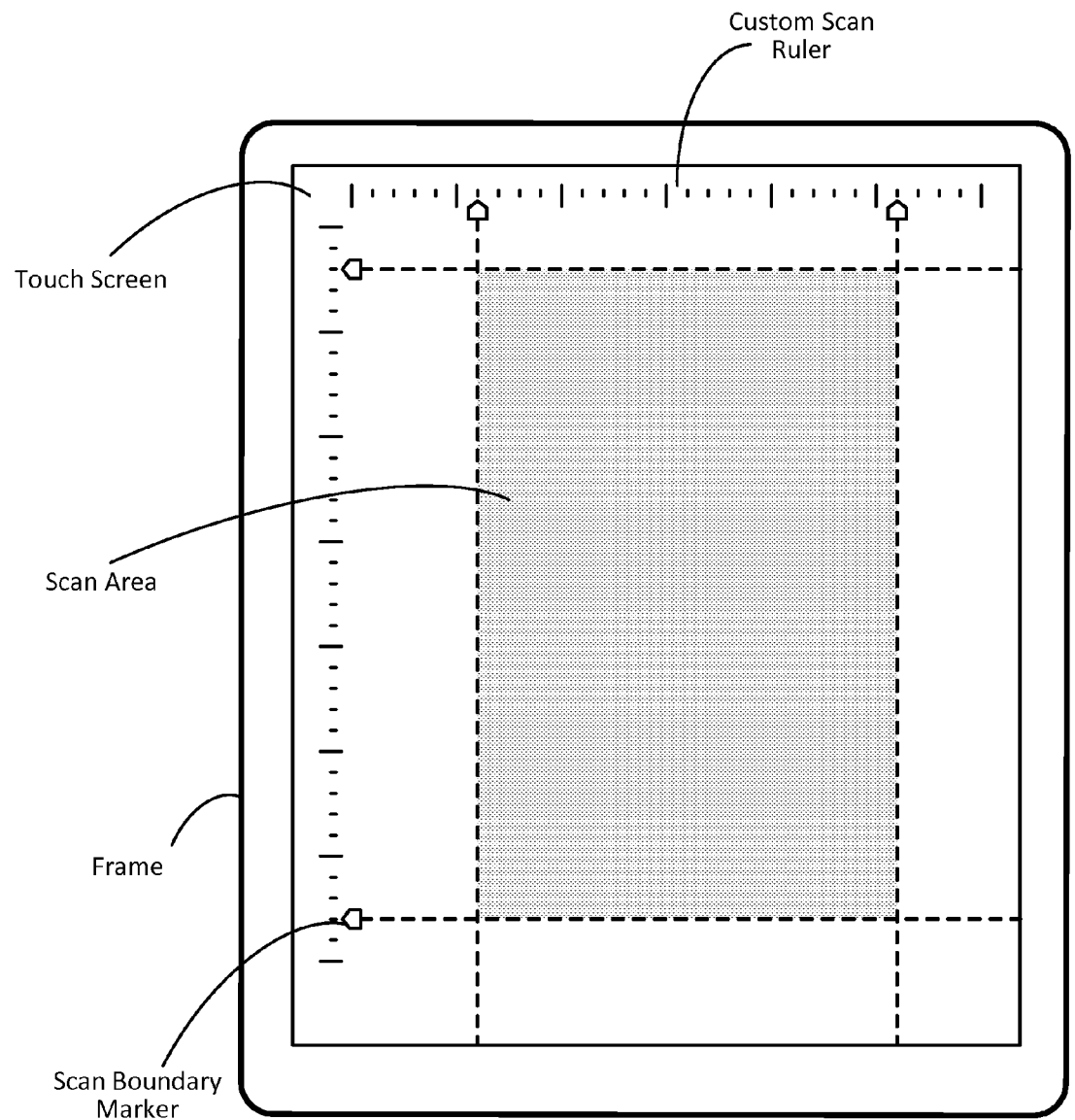
FIG. 4 illustrates an example configurable touch scan and reporting area of an electronic touch sensitive device, in accordance with an embodiment of the present invention.

FIG. 4 illustrates an example configurable touch scan and reporting area of an electronic touch sensitive device, in accordance with an embodiment of the present invention. As can be seen, this particular example shows a shaded selective touch screen area substantially in the center of the touch screen. On the upper and left borders of the touch screen, a custom scan area grid or ruler is provided in this example, along with a number of scan boundary markers/handles that can be adjusted to customize the size of the scan area. In this particular example, the selective touch screen area may be adjusted to a custom size by relocating the various scan boundary markers. In such an example, the selective touch screen area may be associated with one or more applications, with a selective scan function, a selective input reporting function, a no-scan function, or any combination of the previously discussed selective touch screen features. In some embodiments, multiple such configurable selective touch screen areas may be identified on a single touch screen surface, each having customized scanning and reporting features. As previously explained, the described techniques may be user-configurable or hard-coded. To this end, note that the number of configurable scan areas may be user-configurable. Thus, if the user configures the device to have two configurable scan areas, for instance, then two distinct scan areas would be provisioned, each having a set of adjustable boundary markers so as to allow for full customization with respect to size, location, scanning, and reporting.

Methodologies

Figure 5A:
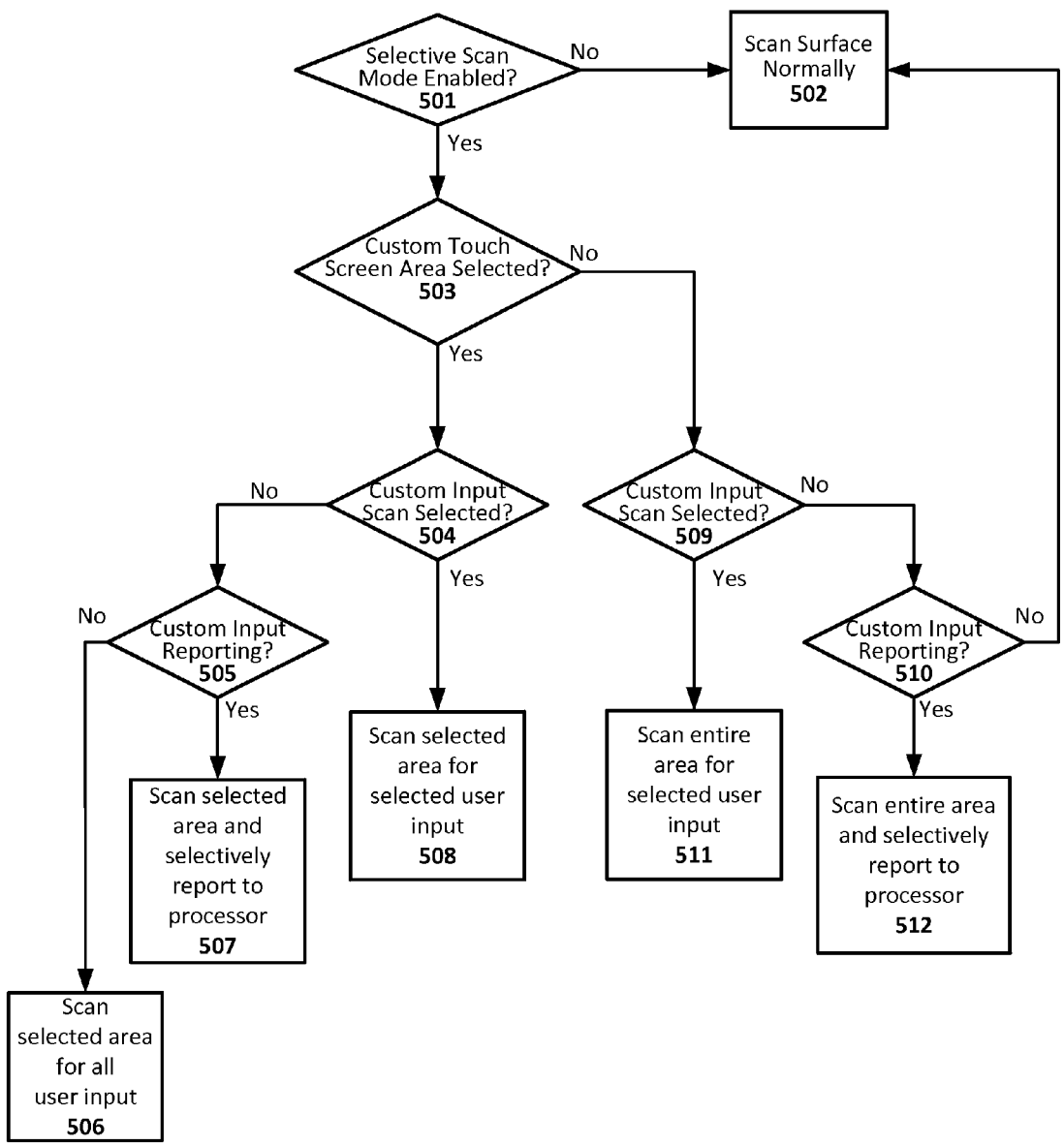
FIG. 5a illustrates a method for selective touch scanning and reporting in an electronic touch sensitive device, in accordance with an embodiment of the present invention.
Figure 5B:
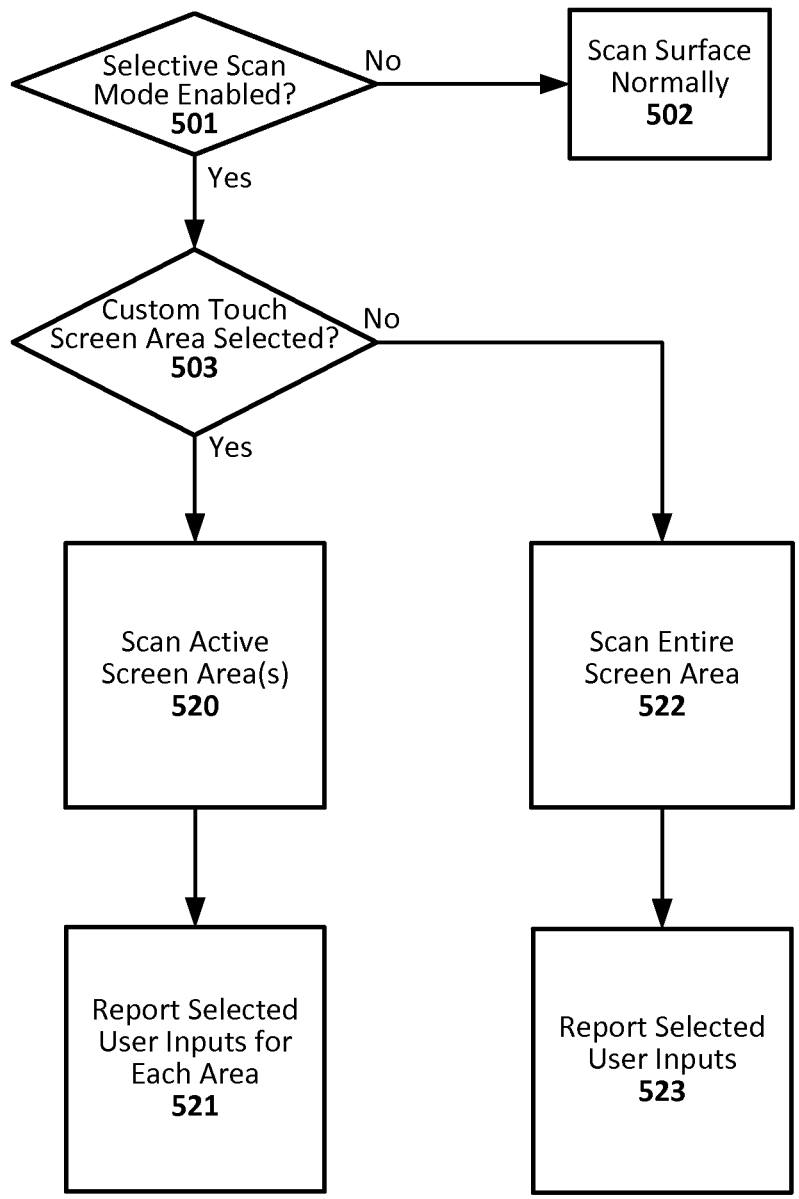
FIG. 5b illustrates another method for selective touch scanning and reporting in an electronic touch sensitive device, in accordance with an embodiment of the present invention.

FIGS. 5a-b illustrates a method for selective touch sensitive scanning and reporting in an electronic touch screen device, in accordance with an embodiment of the present invention. This example methodology may be implemented, for instance, by the touch screen controller of the touch sensitive electronic device shown in FIG. 2. To this end, the touch screen controller module can be implemented in software, hardware, firmware, or any combination thereof, as will be appreciated in light of this disclosure.

In general, any touch sensitive device may be used to detect user contact. As soon as the user begins to drag or otherwise move a finger or stylus tip, the touch screen controller code (and/or hardware) can assume a drag gesture has been engaged and track the path of the user contact with respect to any fixed point within the touch surface until the user stops engaging the touch screen surface. The release point can also be captured by the controller as it may be used to commit the action started when the stylus pressed on the touch sensitive surface. In a similar fashion, if the user releases the contact without moving the finger or stylus tip, a tap or press or press-and-hold command may be assumed depending on the amount of time the user was continually pressing on the touch sensitive surface. Those main detections can be used in various ways to implement UI functionality.

In the example shown in FIG. 5a, the method includes determining 501 whether the selective touch screen mode is enabled. If not, then the screen surface may be scanned 502 normally. If the selective touch screen mode is enabled, the method may continue with determining 503 whether a custom touch screen area is enabled. A custom touch screen area may be any area other than the entire touch screen area and such a custom touch screen area may be configurable by the user, default touch screen area settings may be associated with specific applications, or they may be hard-coded. Also, multiple custom touch screen areas may be present on the touch screen of a single device. If a custom touch screen area is selected, the method may continue with determining 504 whether a custom input scan is enabled. Similarly with the custom touch screen area, the custom input scan feature may be configurable by the user, it may have a default setting associated with specific applications, or it may be hard coded into the device. If a custom input scan is enabled, then the method may continue with scanning 508 the selected area of the touch screen only for a selected input. One example of such a scan would be to scan only a section of the screen for an active stylus input. If no custom input scan is selected, then the method may continue with determining 505 whether custom input reporting is enabled. Custom input reporting is distinct from custom input scanning because an input is scanned for and rejected by the screen controller, rather than not being scanned for at all. If custom input reporting is enabled, the method may continue with scanning 507 the selected area of the touch screen and selectively reporting to the processor the desired inputs, while discarding ail other inputs detected. If no custom input reporting is enabled, the method may continue with scanning 506 the selected touch screen area for all user inputs.

If, however, a custom touch screen area is not selected at 503, the method may continue with determining 509 whether a custom input scan is selected for the entire touch screen. If a custom input scan is selected, the method may continue with scanning 511 the entire screen area for the selected user input. If no custom input scan is selected, the method may continue with determining 510 whether custom input reporting is enabled. If custom input reporting is enabled, the method may continue with scanning 512 the entire screen area and selectively reporting to the processor only the desired inputs, while discarding all other inputs detected. If no custom input reporting is enabled, the method may continue with scanning 502 the surface normally, The various features and functions descried above may be configured in a configuration sub-menu, like the one shown in FIG. 1*d*, or they may be hard coded as previously explained.

FIG. 5*b* illustrates another method for selective touch scanning and reporting in an electronic touch sensitive device, in accordance with an embodiment of the present invention. In this example case, the method also includes determining 501 whether the selective touch screen mode is enabled. If not, then the screen surface may be scanned 502 normally. If the selective touch screen mode is enabled, the method may continue with determining 503 whether a custom touch screen area is enabled. A custom touch screen area may be any area other than the entire touch screen area and such a custom touch screen area may be configurable by the user, default touch screen area settings may be associated with specific applications, or they may be hard-coded. Also, multiple custom touch screen areas may be present on the touch screen of a single device. If a custom touch screen area is selected, the method may continue with scanning 520 the one or more selected/active screen areas. The method may then continue with reporting 521 selected user inputs for each active screen area. The inputs that are reported for each active screen area may be configurable, or may be hard coded in the device. If no custom touch screen area is selected, the method may continue with scanning 522 the entire screen area. The method may then continue with reporting 523 selected user inputs; and as discussed above, the inputs that are reported may be configurable or hard coded in the device.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An electronic device, comprising:
 a processor;
 a touch screen display for displaying content to a user and having an input detecting area, the touch screen display allowing a plurality of user input gesture types from a plurality of user input sources;
 a touch screen controller having a selective touch screen mode configured to selectively scan the touch screen display by scanning for input from a preselected portion of the input detecting area that is not all of the input detecting area of the touch screen display, such that there is a portion of the input detecting area where scanning for input is not performed, and wherein the selective touch screen mode is further configured to selectively report the scanned input from only the preselected portion of the input detecting area to the processor by reporting only a preselected subset of the user input gesture types detected by the touch screen display, such that there is one or more of the user input gesture types that are ignored if detected by the touch screen display, regardless of the user input source; and
 a user interface configured to present a set of adjustable boundary markers so as to allow for user-customization of the preselected portion of the input detecting area with respect to size and location, the user interface further configured to simultaneously present the preselected subset of the user input gesture types and one or more applications that are selectable, the selectable user input gesture types including a stylus input, a tap input, and a swipe gesture input, and the one or more applications being executable on the electronic device and selectable to determine for which of those applications the selective touch screen mode is enabled.

2. The device of claim 1 wherein the touch screen controller is further configured for selectively scanning the touch screen display by scanning multiple discrete sections of the input detecting area.

3. The device of claim 1 wherein the user input sources include active stylus input resulting from direct or proximate contact with the touch screen display, capacitive stylus input resulting from direct contact with the touch screen display, and user contact input resulting from direct contact by one or more fingers of the user with the touch screen display, and wherein the touch screen controller is further configured for selectively scanning the touch screen display by scanning for only a subset of the user input sources and not for at least one other of the user input sources.

4. The device of claim 3 wherein the subset of user input sources includes only one of active stylus input, capacitive stylus input, and user contact input.

5. The device of claim 1 wherein the touch screen controller selectively scans for input from only user contact.

6. The device of claim 1 wherein the preselected subset of user input gesture types that are selectively reported to the processor includes only one of single-point gestures and multi-point gestures.

7. The device of claim 1 wherein the device is an eReader device or a tablet computer or a smartphone.

8. The device of claim 2 wherein the controller is further configured for reporting to the processor distinct user contacts detected within each of the discrete sections.

9. A system, comprising:
a processor;
a touch sensitive screen having an input detecting area and configured for detecting input from a plurality of user input sources;
a touch screen controller having a selective touch screen mode configured to selectively scan the touch sensitive screen by scanning for only a subset of the user input sources and not for at least one other of the user input sources, such that only input received from the subset of the user input sources is reported to the processor;
wherein the selective touch screen mode is further configured to selectively report to the processor only a preselected subset of user input gesture types detected by the touch sensitive screen, such that there is one or more of the user input gesture types that are ignored if detected by the touch sensitive screen, regardless of the user input source, and
wherein the selective touch screen mode is further configured to selectively scan for input from a preselected portion of the input detecting area that is not all of the input detecting area of the touch sensitive screen, such that there is a portion of the input detecting area where scanning for input is not performed; and
a user interface configured to present a set of adjustable boundary markers so as to allow for user-customization of the preselected portion of the input detecting area with respect to size and location, the user interface further configured to simultaneously present the preselected subset of the user input gesture types and one or more applications that are selectable, the selectable user input gesture types including a stylus input, a tap input, and a swipe gesture input, and the one or more applications being executable on the system and selectable to determine for which of those applications the selective touch screen mode is enabled.

10. The system of claim 9 wherein the system is an eReader device or a tablet computer or a smartphone.

11. The system of claim 9 wherein the controller is configured to scan multiple discrete areas within the entire touch screen area.

12. The system of claim 9 wherein the preselected portion is less than half of the total area of the touch sensitive screen.

13. The system of claim 9 wherein the preselected subset of user input gesture types is selected from a set that includes single-point tap gestures, multi-point tap gestures, single-point press-and-hold gestures, multi-point press-and-hold gestures, pinch gestures, single-point swipe or sweeping gestures, and multi-point swipe or sweeping gestures.

14. A non-transitory computer readable medium encoded with instructions that when executed by one or more processors, cause a process to be carried out in a system having a touch screen display, the touch screen display having an input detecting area and configured for detecting input from a plurality of user input sources and for allowing a plurality of user input gesture types, the process comprising:
selectively scanning the touch screen display by scanning for input from a preselected portion of the input detecting area that is not all of the input detecting area of the touch screen display, such that there is a portion of the input detecting area where scanning for input is not performed; and
selectively reporting the scanned input from only the preselected portion of the input detecting area to a processor by reporting only a preselected subset of the user input gesture types detected on the touch screen display, such that there is one or more of the user input gesture types that are ignored if detected by the touch screen display, regardless of the user input source; and
presenting a user interface configured to present a set of adjustable boundary markers so as to allow for user-customization of the preselected portion of the input detecting area with respect to size and location, the user interface further configured to simultaneously present the preselected subset of the user input gesture types and one or more applications that are selectable, the selectable user input gesture types including a stylus input, a tap input, and a swipe gesture input, and the one or more applications being executable on the system and selectable to determine for which of those applications the selective touch screen mode is enabled.

15. The computer readable medium of claim 14 wherein selectively scanning the touch screen display further includes scanning multiple discrete portions of the touch screen display.

16. The computer readable medium of claim 14 wherein selectively scanning the touch screen display further includes scanning for only a subset of the user input sources and not for at least one other of the user input sources, the subset of the user input sources is selected from a set that includes active stylus input resulting from direct or proximate contact with the touch screen display, capacitive stylus input resulting from direct contact with the touch screen display, and user contact input resulting from direct contact by one or more fingers of a user with the touch screen display.

* * * * *